United States Patent [19]
Tompkins

[11] 3,956,944
[45] May 18, 1976

[54] TORQUE OPERATED, VARIABLE DIAMETER BELT SHEAVE OR CHAIN SPROCKET

[76] Inventor: Leo L. Tompkins, 127 Wacester St., Jackson, Miss. 39209

[22] Filed: Jan. 2, 1975

[21] Appl. No.: 538,217

[52] U.S. Cl. ............................. 74/244; 74/230.23
[51] Int. Cl.² ................. F16H 55/30; F16H 55/54
[58] Field of Search ............ 74/244, 217 B, 230.18, 74/230.23

[56] References Cited
UNITED STATES PATENTS
| | | | |
|---|---|---|---|
| 607,322 | 7/1898 | Adams | 74/244 |
| 3,850,045 | 11/1974 | Hagen | 74/244 |

*Primary Examiner*—Leonard H. Gerin
*Attorney, Agent, or Firm*—Sughrue, Rothwell, Mion, Zinn & Macpeak

[57] ABSTRACT

A variable ratio chain sprocket is disclosed wherein a plurality of chain engaging segments are slidingly affixed between a first pair of disks and are constrained to move in a radial direction with respect thereto. A second pair of disks, rigidly attached to a shaft, are disposed adjacent the first pair of disks and engage a projection on the segments in spiral slots. The torque applied to the sprocket controls the relative rotation between the first and second pair of disks and causes the chain engaging segments to move in a radial direction. The chain engaging segments have teeth movably attached thereto. The teeth are depressed radially inwardly when contacted on the top by a chain roller.

4 Claims, 6 Drawing Figures

TORQUE OPERATED, VARIABLE DIAMETER BELT SHEAVE OR CHAIN SPROCKET

BACKGROUND OF THE INVENTION

1. Field of the Invention

This invention relates to a variable ratio chain sprocket wherein the torque transmission ratio is controlled by the torque applied to the sprocket. The ratio is changed by varying the effective diameter of the sprocket, while providing means for keeping the chain in mesh with the sprocket as the diameter is varied.

2. Description of the Prior Art

Power transmission systems having pulleys with infinitely variable diameters are well known, as illustrated by the following issued U.S. Pat. Nos.:

| | |
|---|---|
| 672,962 | Seymour |
| 1,496,032 | Sleeper |
| 1,626,701 | Sleeper |
| 3,279,271 | Sockl |

All of these patents show such an infinitely variable pulley associated with a belt drive power transmission system. The concepts of these prior art power transmission systems have not been utilized in a chain drive sprocket due the impossiblility of maintaining the chain engaging sprocket teeth in constant mesh with the chain, since the circumferential distance between the teeth varies as the diameter of the sprocket varies.

U.S. Pat. No. 2,421,368 to Aubert discloses a chain sprocket having a variable diameter to change the drive ratio, but the diameter is adjustable only to finite positions in order to insure that the sprocket teeth are properly spaced to engage the chain. Thus, an infinitely variable power transmission ratio is impossible utilizing the Aubert apparatus.

U.S. Pat. No. 1,633,746 to Jereczek discloses a chain drive sprocket having adjustable teeth to maintain engagement with the chain despite stretching or wear in the chain. However, there is no adjustable diameter shown by Jereczek to vary the power transmission ratio. Indeed, due to its complexity, it would be impossible to utilize the Jereczek apparatus in conjunction with a variable diameter, chain drive sprocket.

It is an object of the instant invention to provide a chain drive sprocket having an infinitely variable power transmission ratio.

It is a further object of the invention to provide a chain drive sprocket wherein the power transmission ratio varies with the torque applied to the sprocket.

Additionally, it is an object of the invention to provide a chain drive sprocket having means to insure that at least one tooth is in mesh with the chain regardless of the diameter of the chain sprocket.

DETAILED DESCRIPTION OF THE INVENTION

Figure 1:
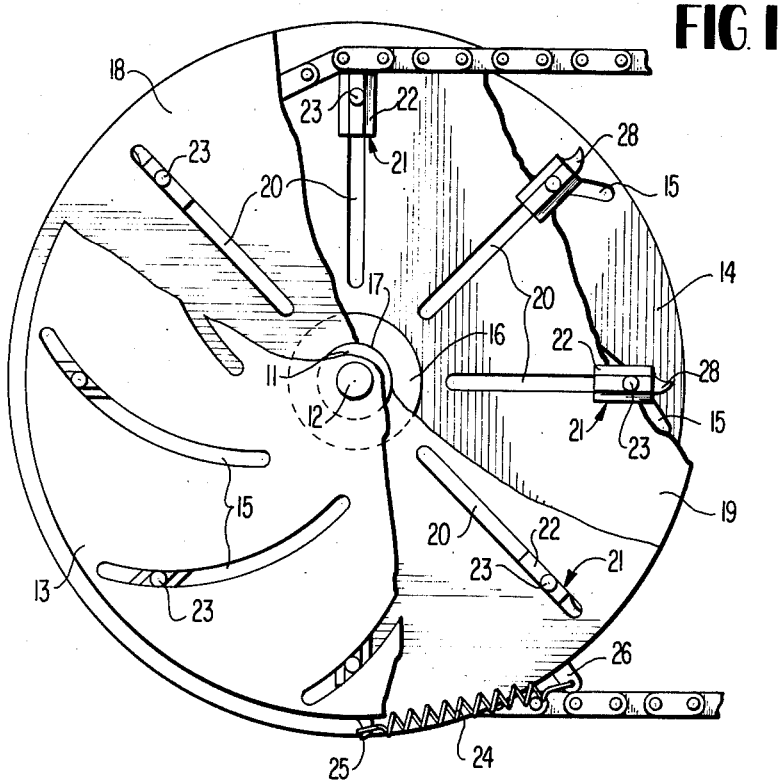
FIG. 1 shows a partially cut away view of a chain drive sprocket according to the invention.
Figure 2:
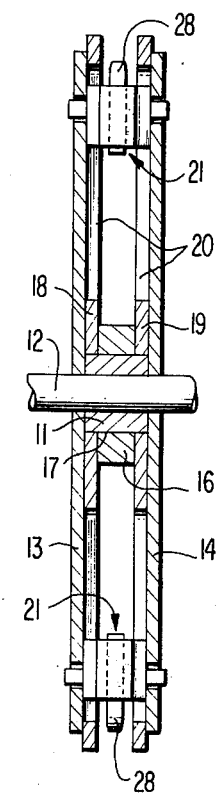
FIG. 2 shows a sectional view of the chain drive sprocket of FIG. 1.

As best shown in FIGS. 1 and 2, a first hub 11, is connected to a shaft 12, such that hub 11 rotates with shaft 12. Any means may be utilized to connect hub 11 to shaft 12.

Two outer disks 13 and 14 are rigidly attached to the first hub 11 and are made to be concentric with and perpendicular to shaft 12 and hub 11. These disks have spiral grooves, or slots, 15 which start on the inside at a convenient diameter and end at their outermost points near the circumference of the disks. The disks 13 and 14 are spaced from each other in a direction along the axis of shaft 12, as best seen in FIG. 2.

A second hub 16 is disposed between the disks 13 and 14, about hub 11. Hub 16 has a bearing surface 17 sliding on the outer surface of hub 11, making the second hub 16 free to rotate with respect to first hub 11, and shaft 12.

Two inner disks 18 and 19 are affixed to hub 16 so as to be adjacent the disks 13 and 14, and to rotate with hub 16. Disks 18 and 19 have radial slots 20 in the same number and circumferential spacing as the spiral slots 15 in the disks 13 and 14.

Figure 3:
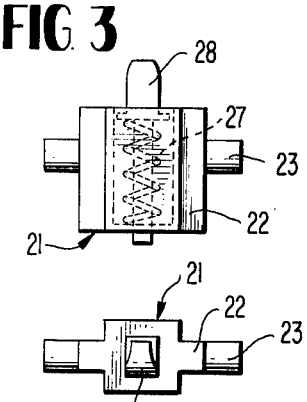
FIG. 3 shows a detailed front view of the chain engaging segment.
Figure 4:
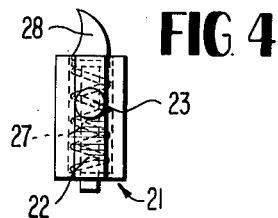
FIG. 4 shows a side view of the chain engaging segment of FIG. 3.
Figure 5:
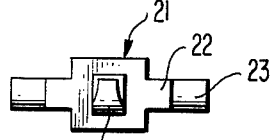
FIG. 5 shows a top view of the chain engaging segment of FIG. 3.

Chain engaging segments 21, shown in FIGS. 3–5, are provided in the number that there are grooves or slots in each disk. These are disposed between the disks 18 and 19. The segments have first projections 22, on each side of the proper size and shape to slidingly engage the radial slots in disks 18 and 19 and sufficient length to reach thru each of the disks 18 and 19. The segments are not able to turn in said slots because of their flattened contour. Second projections 23, preferably round, project from the first projections and are of a size and length to engage the spiral slots in the disks 13 and 14.

The projections on each segment engage the grooves in both sets of disks (13, 14; 18, 19) and, therefore, can have only one radial position for each of the possible angular relations between the two sets of disks. The curves of the spiral grooves 15 are coordinated so that all of the segments 21 are at the same radial distance from the center for each angular setting of the disks.

Spring 24, shown in FIG. 1, is connected, between the outer disks (13, 14) and the inner disks (18, 19), so as to bias them at one extremity of their angular positions, which is limited by the intersections of the spiral slots 15 and radial slots 20. One possible arrangement is to connect spring 24 around the rim of the disks between anchor 25 attached to one of the outer disks 13 or 14 and anchor 26 attached to one of the inner disks, 18 or 19.

A variable sprocket which is to be used as the driving sprocket is made so that the spring 24 holds the device such that the segments are at their maximum diameter position when no torque is being applied. The torque transmission ratio will be at its highest in this position.

When torque is applied to the shaft 12, it is resisted by the remainder of the drive train; a point is reached when the spring 24 begins to yield and allow the outer disks 13 and 14 to rotate relative to inner disks 18 and 19. Then the sprocket segments 21, and the inner disks 18 and 19 with radial slots 20, will lag behind the driven assembly, consisting of shaft 12, inner hub 11 and outer disks 13 and 14, due to the elasticity in the spring 24. The segments 21 will move inward in unison as the intersection of the radial and spiral grooves move in, due to changing angular displacement between the inner and outer disk assemblies. Thus, the torque transmission ratio will be lowered accordingly. Application of additional torque will, in the same manner, lower the ratio until the maximum low is reached: in that position the drive sprocket segments are at their minimum diameter and the driving force has its maximum advantage in pulling the load.

A variable sprocket which is to be used as a driven sprocket, is made so that the spring 24 holds the device so that the segments are at their minimum diameter positions when no torque is being applied. As a torque load, transmitted by the chain increases above that which the spring 24 can restrain without yielding, the outer disks 13 and 14, with the spiral grooves, will rotate with respect to and will lag behind the driven inner disks 18 and 19. This relative angular displacement forces segments 23 to slide up the spiral grooves, and, accordingly, the diameter of the sprocket increases. Thus the transmission ratio is lowered and the advantage of the driving force is improved.

The change in the torque transmission ratio, associated with a given change in applied torque, can be adjusted by the spring 24 so that the input torque at the driving sprocket will remain with a narrow band of change, as the load on the output shaft changes the full range of ratios available. This is possible because, as the ratios change, the advantage given to the driving force is applied ahead of the point where the force affects the change (the variable rim of the output sprocket) and the advantage is effective at this point. Thus the additional effort to shift the spring can be offset by the very change in ratio that it caused. Too much feedback, of course, will cause the device to shift all the way, without the advantage of gradual change. The gain in advantage, of course, is offset by the fact that the drive sprocket has to make more turns to get the work done.

An infinitely variable sprocket must have means to keep the chain in mesh, as the circumferential distance between the sprocket teeth varies as the diameter of the sprocket wheel varies, and the openings in the chain cannot fit all the teeth all the time. This is accomplished by having the teeth on each segment biased in a radially outward direction so that when the rollers of the chain engage the top or forward side of the tooth, the tooth is depressed radially inwardly and will pop up again when the chain slips to where it properly meshes. The chain can even slide backwards over the entire sprocket, or individual teeth. This permits the sprocket to change ratios quickly subject to the torque demands of the drive.

One example of providing the biased teeth is shown in FIGS. 3-5. The tooth 28 is shaped on its concave engagement side so that it engages the roller on the chain in one direction but will tend to slip under the roller in the opposite direction. The tooth is held radially outward by a spring 27 located within segment 21. The tension of the spring 27 will yield to pressure of the chain so as to move into the segment 21 whenever the chain roller presses on it from the top or from the convex front side.

Obviously, the tooth 28 may be attached to segment 21 by any means which will allow it to move radially inwardly with respect to the segment. It may be pivotally attached to the segment such that engagement with the chain roller from the top or front side will cause the tooth to pivot with respect to the segment.

As the diameter of the sprocket changes, at least one tooth will be in contact with the active surface of the chain and the other teeth can be counted on to yield to the changing space by sliding into proper mesh on their bias. In the driven position, the last tooth to come into play will yield when the diameter is expanding and the one that is nearing to point of disengaging, will be in contact and pulling.

The maximum mismatch across all of the teeth will be one tooth, and this space will be divided between at least half the teeth on the sprocket. An eight tooth sprocket will have only about one sixth of a space slip in making engagement when the pulling tooth leaves the point where it no longer can engage.

Figure 6:
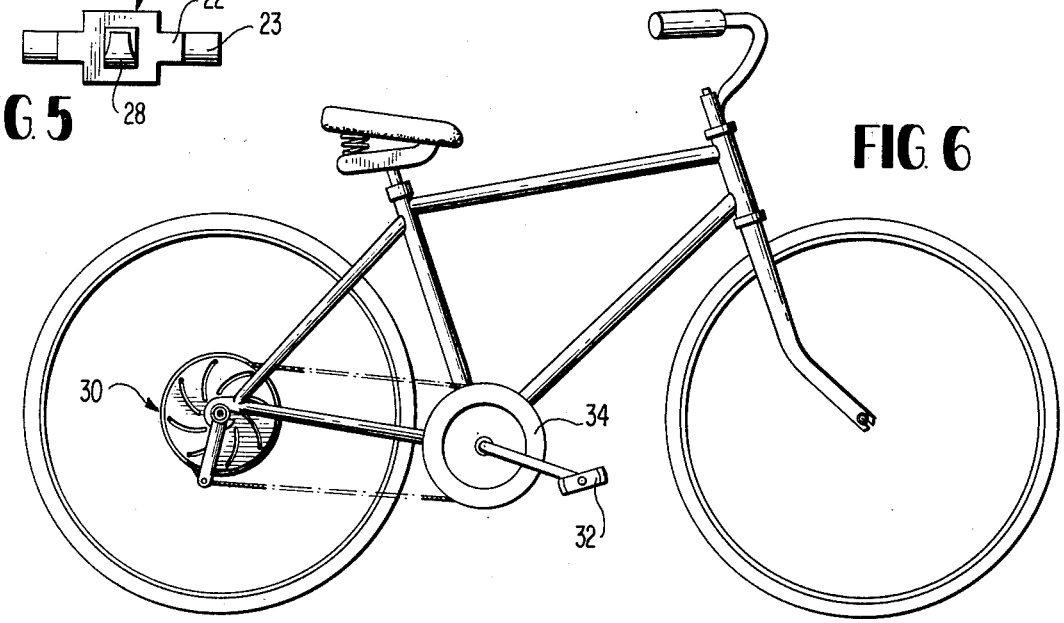
FIG. 6 shows the chain drive sprocket of FIG. 1 utilized as a bicycle transmission.

FIG. 6 illustrates one possible use of the torque operated, infinitely variable diameter chain sprocket of the present invention. The sprocket assembly is utilized as an infinitely variable ratio bicycle transmission. The rear axle of the bicycle is analagous to shaft 12 shown in FIGS. 1 and 2. The transmission, shown generally as element 30, functions as described previously and is constructed as in FIGS. 1 and 2. By varying the torque applied to the chain by the pedals 32 and fixed diameter sprocket 34, the torque applied to the rear wheel will be automatically varied as discussed previously. Spring chain take up means 36 is provided to maintain a constant tension on the chain as the diameter of the variable sprocket varys.

What we claim is:

1. In a power transmission system having a chain sprocket engaging an endless chain, for receiving an input torque and transmitting an output torque, the improved means for varying the torque transmission ratio comprising:
    a. a plurality of segments disposed concentrically about a shaft, said segments engaging said endless chain;
    b. an outer pair of disks each having a plurality of spiral slots therethrough extending in a generally radial direction, attached to said shaft so as to rotate therewith, said outer pair of disks being spaced apart along the axis of said shaft and being substantially perpendicular thereto;
    c. an inner pair of disks each having a plurality of radial slots therethrough, attached to said shaft so as to rotate about said shaft, said inner pair of disks being spaced apart along the axis of the shaft and located between said outer pair of disks;
    d. means attached to each segment to engage one slot in each of said disks such that relative rotation between the outer pair of disks and the inner pair of disks causes said segments to move radially with respect to said shaft,
    e. a tooth movably attached to each of said segments for engaging said endless chain between rollers of said chain; and,
    f. means to bias said tooth so as to protrude radially from said segment, said biasing means allowing said tooth to retract into said segment when contacted by a chain roller in a predetermined direction.

2. The improved power transmission system of claim 1 wherein said means attached to each segment to engage said slots comprises:
    a. first projections projecting from opposite sides of said segment to slidingly engage said radial slots through said inner pair of disks; and b. a second projecton projecting from each of said first projections so as to extend through the radial slots in said inner pair of disks and slidingly engage said spiral slots through said outer pair of disks.

3. The improved power transmission system of claim 2 further comprising means to bias said outer pair of disks and said inner pair of disks in a position such that each of said segments is at one extremity of said radial slots when no input torque is applied to said system.

4. In a power transmission system, having a chain sprocket engaging an endless chain, for receiving an input torque and transmitting an output torque, the improved means for varying the torque transmission ratio comprising:
 a. a shaft;
 b. an outer pair of disks attached to said shaft so as to rotate therewith, each of said outer pair of disks having a plurality of spiral slots therethrough extending in a general radial direction, said disks being spaced apart along the longitudinal axis of said shaft and being substantially perpendicular thereto;
 c. a hub disposed between said outer disks and about said shaft so as to rotate with respect thereto;
 d. an inner pair of disks, each having a plurality of radial slots therethrough, attached to said hub so as to rotate therewith, said disks being spaced apart along the axis of said shaft and located between said outer disks;
 e. a plurality of segments disposed between said inner pair of disks and concentrically about said shaft, each segment having first projections projecting from each side thereof and slidingly engaging the radial slots through said inner pair of disks, and second projections projecting from said first projections extending through said radial slots and slidingly engaging said spiral slots through said outer pair of disks;
 f. means to bias said outer pair of disks with respect to said inner pair of disks such that each of said segments is at one extremity of said radial slots when no input torque is applied;
 g. a tooth movably attached to each of said segments for engaging said endless chain between rollers of said chain; and
 h. means to bias said tooth so as to protrude radially from its respective segment, said biasing means allowing said tooth to retract into said segment when contacted by a chain roller from a predetermined direction.

* * * * *